Feb. 13, 1934.  F. W. PARKER  1,946,877
FREEWHEELING DEVICE
Filed June 29, 1931

INVENTOR.
FREDERIC W. PARKER.
BY
Munn & Co
ATTORNEYS.

Patented Feb. 13, 1934

1,946,877

UNITED STATES PATENT OFFICE 1,946,877

FREEWHEELING DEVICE

Frederic W. Parker, Lovelock, Nev.

Application June 29, 1931. Serial No. 547,717

1 Claim. (Cl. 192—41)

My invention relates to improvements in a positive free-wheeling device, and it consists of the combinations, constructions and arrangements hereinafter described and claimed.

An object of my invention is to provide a positive free-wheeling device which is extremely simple in construction and in which cone or disc clutches are dispensed with, thus obviating the disadvantage of having any slippage between clutch members. The device will automatically disconnect the propeller shaft from the engine shaft when the former is rotating faster than the latter and will positively connect the two shafts together when the engine shaft starts to gain speed and to rotate faster than the propeller or driven shaft. If desired the entire device may be made inoperative and the drive and driven shafts connected directly to each other by any well known type of clutch mechanism.

Other objects and advantages will appear in the following specification, and the novel features of the device will be particularly pointed out in the appended claim.

Figure 1:
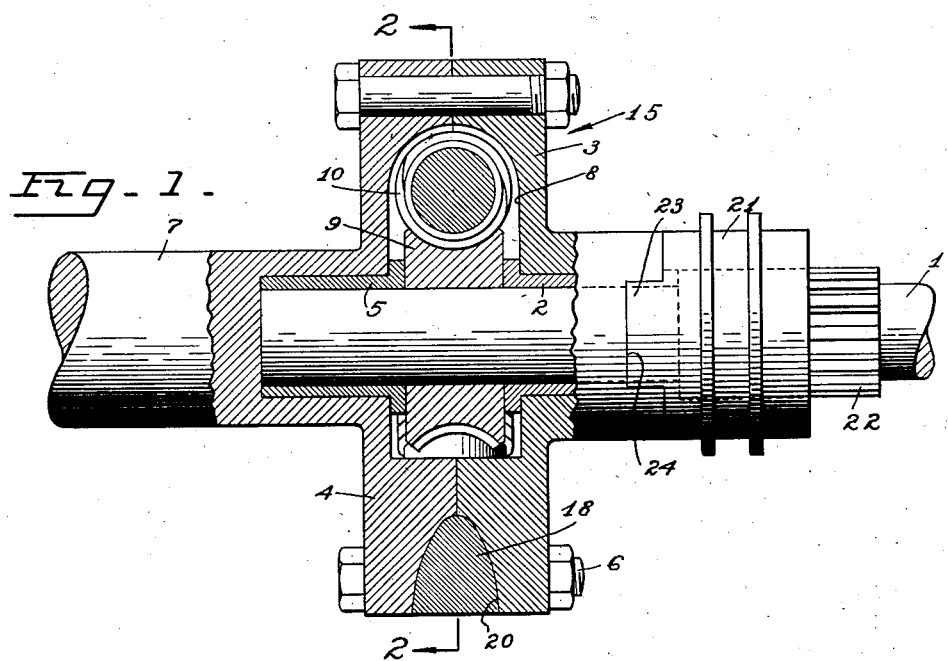
Figure 2:
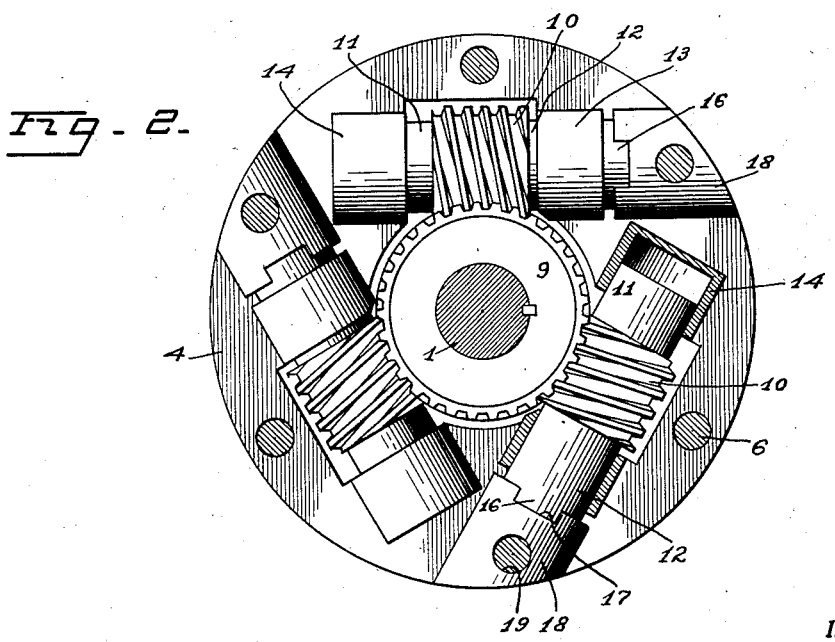

My invention is illustrated in the accompanying drawing forming a part of this application, in which Figure 1 is a side elevation of the device, portions being broken away; and Figure 2 is a section along the line 2—2 of Figure 1.

In carrying out my invention I provide a drive shaft 1, which is designed to be connected to the engine by a standard automobile clutch not shown. A bushing 2 is mounted upon the shaft 1 and a rotatable member 3 is mounted on the bushing. A member 4 similar to the member 3 is mounted on a second bushing 5, which in turn is mounted upon the shaft 1. The members 3 and 4 are secured to each other by bolts 6 or other suitable fastening means. The bushings 2 and 5 are rotatively mounted on the shaft 1.

The member 4 has an extension which may form the driven or propeller shaft 7 or this extension may be connected directly to the propeller shaft by a universal joint not shown. The members 3 and 4 form a cage or casing having a recess 8 for receiving a worm gear 9 that is keyed to the shaft 1. The gear 9 meshes with a worm 10 and this worm has integral shaft portions 11 and 12 slidably and rotatably received in bushings 13 and thrust washers 14. In Figure 2 I show three worms 10 disposed about the worm gear 9, but it is obvious that one worm would answer the purpose and I merely show the other two worms for the effect of balance and to provide a stronger device. It is obvious that one worm could be used, and the cage 15 balanced by other means. The worms 10 have sufficient pitch to cause them to be rotated by the worm gear 9 when the shaft 7 is "over running" the driven member.

It will further be noted from Figure 2 that the shaft portion 12 has a jaw 16 receivable in a cooperating jaw 17. The jaw 17 is formed in a part 18 cylindrical in shape and having an opening 19 for receiving one of the bolts 6. The parts 3 and 4 of the cage 15 have recesses 20 (see Figure 1) for snugly receiving the bushings 13, the thrust washers 14 and the parts 18.

A clutch for directly connecting the shafts 1 and 7 together is provided and comprises a clutch member 21 splined at 22 to the shaft 1 and having jaws 23 designed to enter recesses 24 in the member 3 and to lock the shafts together as a unit.

From the foregoing description of the various parts of the device, the operation thereof may be readily understood.

Assume that the shaft 1 is to be rotated; the initial rotation of the shaft will cause the worm gear 9 to move the worms 10 along their axes and this will operatively connect the jaws 16 and 17 together. The longitudinal movement of the worms 10 and their stub shafts 12 will take place before any rotative movement is imparted to the worms. As soon as the jaws 16 and 17 engage with each other further rotation of the worms 10 is prevented and the result will be a locking of the worm gear 9 with the worms 10 and the cage 15 will rotate as a unit with the shaft 1. This will rotate the driven shaft 7 as a unit with the shaft 1.

If now the driven shaft should gain speed so as to rotate faster than the drive shaft 1, there will be a relative movement between the cage 15 and the worm gear 9 which movement will cause the worm gear 9 to move the worms 10 longitudinally in the opposite direction so that their stub shafts 11 will be moved into the thrust washers 14 and the jaws 16 will be disengaged from the jaws 17. So long as the shaft 7 rotates faster than the shaft 1 the jaws 16 and 17 will be disconnected and there will be a rotation between the worm gear 9 and the worms 10.

Should now the drive shaft 1 gain in speed so as to equal the speed of the driven shaft 7 and then to rotate slightly faster, the same operation as first described will take place, i. e. the worm gear 9 will move the worms 10 longitudinally and the jaws 16 will again engage with the jaws 17. The driven shaft 7 is therefore automatically connected to the drive shaft 1. It will be seen from this construction that the driven shaft 7 is automatically connected to the drive shaft 1 when the drive shaft tends to turn faster than the driven shaft and is automatically disconnected when the driven shaft turns faster than the drive shaft. The connection is a positive one because there are no cone or plate clutches to permit the parts to connect and disconnect. Jaw clutches 16 and 17 can be used because at the moment of the jaw 16 engaging with the jaw 17 there is practically no rotative movement between the shafts 12 and the parts 18.

If the operator wishes to dispense with the free wheeling device entirely he moves the clutch member 21 and causes the jaw 23 on the clutch member 21 to enter the recess 24 in the member 3. This directly connects the cage 15 with the drive shaft 1 and therefore the driven shaft 7 is directly connected to the drive shaft 1. It is obvious that any type of clutch other than the one shown at 21 may be used for directly connecting the cage 15 with the drive shaft 1.

The device when used is positive in action, has a long life, is absolutely dependable and is simple in construction. The parts are not subjected to much wear due to friction. The worm gear 9 and worms 10 may be so proportioned that the frictional losses in the device when the vehicle is coasting are very small, yet whenever the power of the engine is required it will be instantly applied without friction loss or any slippage within the mechanism. There will be no clashing, slipping or grinding of gears because at the instant the jaws 16 tend to mesh with the jaws 17 there will be very little rotary motion between the parts.

Although I have shown and described one embodiment of my invention it is to be understood that the same is susceptible of various changes and I reserve the right to employ such changes as may come within the scope of the claim hereto annexed.

I claim:

A positive action free wheeling device comprising a rotatable cage composed of two parts, a shaft rotatably mounted in the cage, a worm gear carried by the shaft, worms carried by the cage and meshing with the gear, clutches composed of two parts, one being secured to each worm and the others being carried by the cage, and fastening means for securing the two parts of the cage together, said means also preventing rotation of the clutch parts carried by the cage.

FREDERIC W. PARKER.